United States Patent Office 3,152,916
Patented Oct. 13, 1964

3,152,916
ANTI-SKINNING AGENT FOR DRYING OIL COMPOSITIONS
James L. Schwendeman, Dayton, Ohio, assignor to Monsanto Company, a corporation of Delaware
No Drawing. Filed Oct. 26, 1961, Ser. No. 147,767
10 Claims. (Cl. 106—263)

This invention relates to air-hardenable coating compositions. More particularly, this invention relates to anti-skinning agents for drying oil compositions such as paints, lacquers, varnishes and enamels.

Air-hardenable coating compositions such as paints, lacquers, varnishes and enamels containing drying oils must form a hard coating in a reasonable time when spread on a surface as a film. The formation of the coating is usually considered to involve oxidation or polymerization by the air of the drying oil or resins which serve as the vehicular constituent of the composition. Unfortunately, many of these drying oil compositions also tend to develop a tough, rubber-like skin when exposed in bulk to air either in an opened or a closed container. The normal homogeneous character of the composition cannot be restored by mixing because the oxidation and/or polymerization reactions have already taken place.

It is known that the formation of this tough, rubber-like skin on the surface of a drying oil composition stored in bulk can be reduced or prevented by the addition of an anti-skinning agent to the drying oil composition. However, the addition of many of the known anti-skinning agents to the drying oil compositions in an amount sufficient to prevent skinning often results in extending or prolonging the period of time required to air-harden the composition when it is applied as a film or coating. Thus, the utility of the composition is restricted to those uses where a long drying time is possible.

An object of this invention is to provide an anti-skinning agent for reducing or preventing the formation of a tough, rubber-like skin on the surface of a drying oil composition stored in bulk without materially extending the time required for the formation of a tough, hard film when the composition is applied as a coating on a surface.

Another object of this invention is to provide air-hardenable drying oil compositions such as paints, varnishes, lacquers, and enamels which do not readily form a skin when exposed to the air in bulk form.

Another object of this invention is to provide a method for reducing the formation of tough, rubber-like skin on the surface of an air-hardenable drying oil composition exposed to air in bulk form without detrimentally affecting the drying rate of the composition applied as a surface coating.

Other aspects, objects, and advantages of this invention will be apparent from a consideration of the accompanying disclosure and the appended claims.

According to the present invention there is provided an anti-skinning agent comprising a compound selected from the group consisting of 2,6-di-tert-butyl-4-methylaniline and 2,6-di-tert-amyl-4-methylaniline.

Also, according to the present invention, there is provided a coating composition, preferably of the class of paints, varnishes, lacquers and enamels, which include a drying oil that dries and hardens by oxidation, and a compound selected from the group consisting of 2,6-di-tert-butyl-4-methylaniline and 2,6-di-tert-amyl-4-methylaniline in an amount sufficient to reduce the formation of a skin on the surface of the composition stored in bulk without extending the drying time of the composition applied as a surface coating.

Also, according to the present invention, there is provided a method for reducing the formation of a tough, rubber-like skin on the surface of an air-hardenable drying oil composition exposed to air in bulk form without detrimentally affecting the drying rate of the composition applied as a surface coating, said method comprising admixing with said air-hardenable drying oil composition an anti-skinning agent selected from the group consisting of 2,6-di-tert-butyl-4-methylaniline and 2,6-di-tert-amyl-4-methylaniline.

The anti-skinning agents of this invention are limited to the 2,6-di-tert-butyl-4-methylaniline and 2,6-di-tert-amyl-4-methylaniline. Alkyl anilines substituted with other alkyl groups or substituted in other positions have been found to be either ineffective as anti-skinning agents or if effective, to have detrimental effects on the drying oil compositions. These alkyl anilines may be produced by any method known to those skilled in the art; however, a preferred method for the preparation of these particular alkyl anilines involves alkylation of 4-methylaniline with either isobutylene or isoamylene at a temperature in the range of 160–200° C. in the presence of a silica-alumina type catalyst, as disclosed and claimed in the application of John F. Olin, Serial No. 824,487, filed July 2, 1959, now abandoned.

The drying oil compositions which may be improved by the addition of anti-skinning agents of this invention include any of the air-hardenable coating compositions which contain drying oil or resin as a vehicular constituent. Such air-hardenable coating compositions include the paints, varnishes, lacquers, and enamels, all of which are well known compositions of commerce. In addition to the drying oil, which may be either a synthetic or a natural oil such as linseed oil, tung oil, rapeseed oil, sesame oil, sunflower seed oil, polybutadiene, synthetic ester oils, isomerized oils, and the like, such compositions may also contain various film-forming materials, diluents, solvents, extenders, driers, pigments, dyes, and other additives.

The amount of the anti-skinning agent employed in the air-hardenable coating compositions of this invention will vary somewhat depending upon the type of paint, varnish, enamel, or lacquer composition, but will be an amount which is sufficient to substantially reduce the formation of skin on the surface of the bulk composition without substantially extending the drying time of the composition applied as a film on a surface. In most instances, this amount will range from about 0.1% to 10% by weight of the total composition; however, greater or lesser amounts may be desirable with certain drying oil compositions. Usually, with most drying oil compositions, the amount of the anti-skinning agent will be in the range of from 1% to 5% by weight of the composition.

The advantages, desirability, and usefulness of the invention are illustrated by the following examples.

EXAMPLE

In this example, the anti-skinning effect of several alkyl anilines and commercial anti-skinning agents were determined using ASTM method D154–47. The selected compounds were tested in a varnish formulation of the following compositions:

| | Percent by weight |
|---|---|
| Alkyd resin [1] | 71.40 |
| Mineral spirits | 26.99 |
| 6% cobalt naphthenate drier | 0.33 |
| 24% lead naphthenate drier | 1.25 |
| 6% manganese naphthenate drier | 0.03 |

[1] American Cyanamid Company Alkyd Resin Reyl 869–1.

The samples for testing were prepared by the addition of 0.5% by weight of a candidate compound, based on the weight of alkyd resins, to individual samples of the varnish formulation. After mixing, these compositions were placed in four fluid ounce glass jars in an amount so that the jars were only half full. The jars were covered with a piece of aluminum foil through which a pin hole had been punched for the admission of air into the jar. The jars were then stored in the dark in order to eliminate the effects of light. Thereafter, each of the jars was inspected on subsequent days to determine whether a skin had formed on the surface of the varnish composition. The time required for the first formation of the skin was noted and is reported in Table I.

*Table I*

SKINNING TESTS

| Additive | Time in Days to Form Skin |
| --- | --- |
| Commercial Additive No. 1 | 12. |
| Commercial Additive No. 2 | No skin after 41 days. |
| Commercial Additive No. 3 | No skin after 41 days. |
| 2,4,6-tri-tert-butylaniline | 14. |
| 2,6-di-tert-butyl-4-methylaniline | 19. |
| 2-tert-butylaniline | 12. |
| 4-tert-butylaniline | 12. |
| 2,4-di-tert-butylaniline | 12. |
| N-tert-butylaniline | 12. |
| Aniline | 6. |
| Control | 6. |

Commercial Additive No. 1—O-tolyl-biguanide.
Commercial Additive No. 2—N-phenyl-N'-cyclohexyl-p-phenylenediamine.
Commercial Additive No. 3—2,6-di-tert-butyl-4-methylphenol.

The drying time of the various varnish formulations prepared above were determined by application on suitable wood samples and measurement of the time to form a dust-free coating and a hard coating. These data are reported in Table II.

*Table II*

DRYING TESTS

| Additive | Dust Free, Hours | Hard, Hours |
| --- | --- | --- |
| Commercial Additive No. 1 | 2 | 4. |
| Commercial Additive No. 2 | Did not Dry | Did not Dry. |
| Commercial Additive No. 3 | Several Days | Several Days. |
| 2,4,6-tri-tert-butylaniline | 2 | 4. |
| 2,6-di-tert-butyl-4-methylaniline | 2 | 4. |
| 2-tert-butylaniline | 2 | 4. |
| 4-tert-butylaniline | 2 | 4. |
| 2,4-di-tert-butylaniline | 2 | 4. |
| N-tert-butylaniline | 2 | 4. |
| Aniline | 2 | 4. |

Commercial Additive No. 1—O-tolyl-biguanide.
Commercial Additive No. 2—N-phenyl-N'-cyclohexyl-p-phenylenediamine.
Commercial Additive No. 3—2,6-di-tert-butyl-4-methylphenol.

From these data, it will be readily apparent that 2,6-di-tert-butyl-4-methylaniline is an effective anti-skinning agent and also does not increase the drying time of the varnish composition. In addition, the varnish formulation containing this additive had better gloss retention than the formulations containing the commercial additives and weathered as well as these formulations. Although commercial additives 2 and 3 prevented the formation of a skin on the surface of the varnish compositions for a longer period of time than the 2,6-di-tert-butyl-4-methylaniline of this invention, these commercial additives had a very detrimental effect on the drying rate of the varnish composition, as will be noted in Table II. With the anti-skinning agent of this invention, the drying time was the same as that of the varnish not containing any additive, whereas the varnish composition containing commercial additive No. 2 did not dry at all and the varnish composition containing commercial additive No. 3 required several days to dry. The critical nature of the alkyl substitution on the aromatic ring of the aniline is shown in the data of Table I. Thus, 2,4-di-tert-butylaniline inhibited skin formation for a period of 12 days but, the addition of a methyl group to this compound in the 4 position increased inhibition to 19 days. However, the substitution of a tertiary butyl group for the methyl group in the 4 position on the aromatic ring increased the skinning inhibition only 2 days.

Reasonable variation and modification of the invention as described are possible, the essence of which is that there have been provided (1) 2,6-di-tert-butyl-4-methylaniline and 2,6-di-tert-amyl-4-methylaniline as anti-skinning agents, (2) coating compositions of the class of paints, varnishes, lacquers, and enamels containing one of the above-identified anti-skinning agents and (3) methods for reducing tough, rubber-like skin on the surface of air-hardenable drying oil compositions exposed to the air in bulk form without detrimentally affecting the drying rate of the composition applied as a surface coating by incorporation of one of the above-identified anti-skinning agents in said composition.

I claim:

1. An improved air-hardenable coating composition comprising an air-hardenable coating composition which contains drying oils and hardens by oxidation and which normally has a skin formed on the surface thereof when exposed in bulk to air for a substantial period, and a compound selected from the group consisting of 2,6-di-tert-butyl-4-methylaniline and 2,6-di-tert-amyl-4-methylaniline in an amount sufficient to inhibit the formation of said skin without substantially increasing the drying time of said air-hardenable composition.

2. An improved air-hardenable coating composition comprising an air-hardenable coating composition which contains drying oils and hardens by oxidation and which normally has a skin formed on the surface thereof when exposed in bulk to air for a substantial period, and 2,6-di-tert-butyl-4-methylaniline in an amount sufficient to inhibit the formation of said skin without substantially increasing the drying time of said air-hardenable coating composition.

3. An improved air-hardenable coating composition comprising an air-hardenable coating composition which contains drying oils and hardens by oxidation and which normally has a skin formed on the surface thereof when exposed in bulk to air for a substantial period of time, and 2,6-di-tert-butyl-4-methylaniline in an amount of from 0.1 to 10% by weight of said air-hardenable coating composition.

4. An improved air-hardenable coating composition comprising an air-hardenable coating composition which contains drying oils and hardens by oxidation and which normally has a skin formed on the surface thereof when exposed in bulk to air for a substantial period, and 2,6-di-tert-butyl-4-methylaniline in an amount of 0.5% by weight of said air-hardenable coating composition.

5. An improved coating composition comprising a coating composition selected from the group consisting of paint, varnish, lacquer, and enamel and which contains drying oils and hardens by oxidation, and a coating composition selected from the group consisting of 2,6-di-tert-butyl-4-methylaniline and 2,6-di-tert-amyl-4-methylaniline in an amount sufficient to inhibit the formation of skin on the surface of said coating composition when exposed in bulk to air for a substantial period without substantially increasing the drying time of said coating composition.

6. An improved coating composition comprising a coating composition selected from the group consisting of paint, varnish, lacquer, and enamel and which contains drying oils and hardens by oxidation, and 2,6-di-tert-4-methylaniline in an amount sufficient to inhibit the formation of skin on the surface of said coating composition when exposed in bulk to air for a substantial period without substantially increasing the drying time of said coating composition.

7. An improved coating composition comprising a coating composition selected from the group consisting of paint, varnish, lacquer, and enamel and which contains drying oils and hardens by oxidation, and 2,6-di-tert-butyl-4-methyl-aniline in an amount in the range of from 0.1 to 10% by weight of said coating composition.

8. An improved coating composition comprising a coating composition selected from the group consisting of paint, varnish, lacquer, and enamel and which contains drying oils and hardens by oxidation, and 2,6-di-tert-butyl-4-methyl-aniline in an amount of 0.5% by weight of said coating composition.

9. In the process of compounding an air-hardenable coating composition, which comprises blending a film-forming material with a drying oil thereby enabling the composition to air dry by oxidation, the improvement comprising admixing therewith a compound selected from the group consisting of 2,6-di-tert-amyl-4-methylaniline.

10. In the process of compounding an air-hardenable coating composition, which comprises blending a film-forming material with a drying oil thereby enabling the composition to air dry by oxidation, the improvement comprising admixing therewith 2,6-di-tert-butyl-4-methyl-aniline.

References Cited in the file of this patent

UNITED STATES PATENTS

| | | |
|---|---|---|
| 2,403,423 | Zurcher | July 2, 1946 |
| 2,762,845 | Stroh et al. | Sept. 11, 1956 |

UNITED STATES PATENT OFFICE
CERTIFICATE OF CORRECTION

Patent No. 3,152,916                      October 13, 1964

James L. Schwendeman

It is hereby certified that error appears in the above numbered patent requiring correction and that the said Letters Patent should read as corrected below.

Column 4, lines 69 and 70, for "2,6-di-tert-4-methylaniline" read -- 2,6-di-tert-butyl-4-methylaniline --.

Signed and sealed this 13th day of April 1965.

(SEAL)
Attest:

ERNEST W. SWIDER                            EDWARD J. BRENNER
Attesting Officer                            Commissioner of Patents